United States Patent [19]

Sugiyama

[11] Patent Number: 5,192,918

[45] Date of Patent: Mar. 9, 1993

[54] INTERFERENCE CANCELLER USING TAP-WEIGHT ADAPTIVE FILTER

[75] Inventor: Akihiko Sugiyama, Tokyo, Japan

[73] Assignee: NEC Corporation, Tokyo, Japan

[21] Appl. No.: 786,519

[22] Filed: Nov. 1, 1991

[30] Foreign Application Priority Data

Nov. 1, 1990 [JP] Japan .................................. 2-298249

[51] Int. Cl.$^5$ .......................... H03B 1/00; H03K 5/00; H04B 1/10
[52] U.S. Cl. .................................. 328/165; 328/167; 381/71; 455/306; 307/521
[58] Field of Search .................. 328/162, 165, 167; 307/520, 521; 381/71, 93, 94; 455/296, 306

[56] References Cited

U.S. PATENT DOCUMENTS

| | | | |
|---|---|---|---|
| 4,038,536 | 7/1977 | Feintuch | 328/167 |
| 4,127,874 | 11/1978 | Iwasawa et al. | 328/167 |
| 4,589,137 | 5/1986 | Miller | 381/71 |
| 4,658,426 | 4/1987 | Chabries et al. | 381/94 |
| 4,878,188 | 10/1989 | Ziegler, Jr. | 381/71 |

Primary Examiner—Timothy P. Callahan
Attorney, Agent, or Firm—Sughrue, Mion, Zinn, Macpeak & Seas

[57] ABSTRACT

An interference canceller comprises a first input terminal (10) to which a combined signal and noise is supplied, and a second input terminal (12) to which a reference signal correlated with the noise is supplied. A subtractor (11) has a first input coupled to the first input terminal (10) and an output coupled to the output terminal of the canceller. An adaptive filter (13) has an input connected to the second input terminal (12) and an output connected to a second input of the subtractor (11). A detector (14) is provided for generating a signal representative of the magnitude of the output of the subtractor (11). A calculation circuit (17) is coupled to the detector for generating a signal that is inversely variable as a function of the output of the detector. A multiplier (18, 20) scales a stepsize with the inversely variable signal and multiplies the output of the subtractor with the scaled stepsize. The tap-weights of the adaptive filter (13) are controlled according to the multiplied signal.

8 Claims, 2 Drawing Sheets

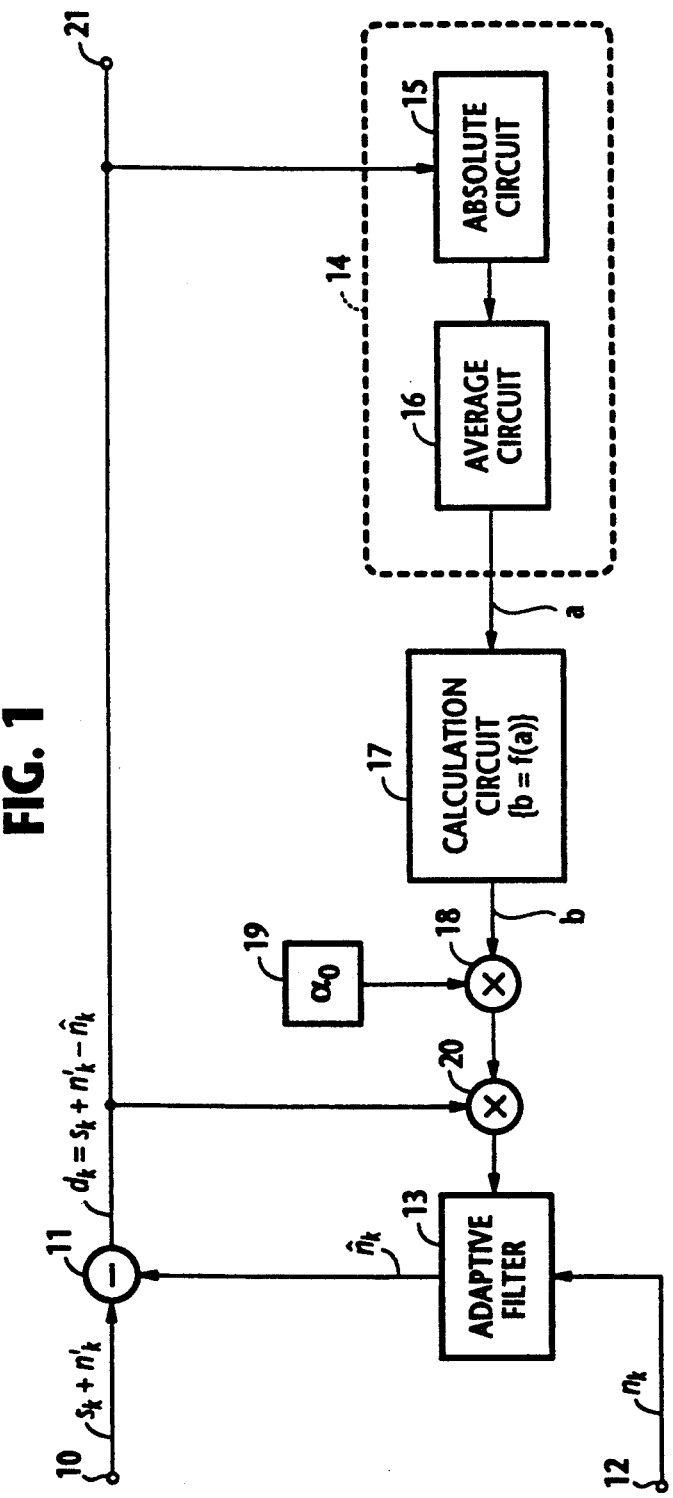
FIG. 1
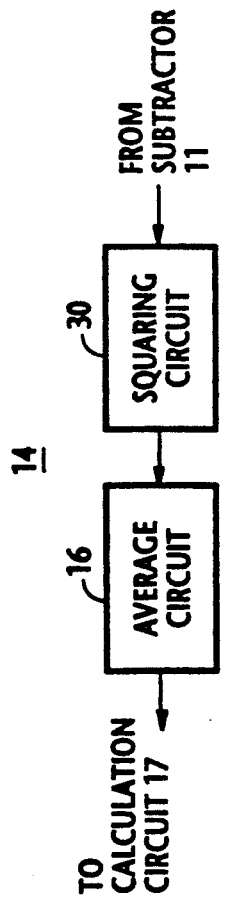
FIG. 3
FIG. 2

INTERFERENCE CANCELLER USING TAP-WEIGHT ADAPTIVE FILTER

BACKGROUND OF THE INVENTION

The present invention relates to an interference canceller using an adaptive filter for approximating the transfer function of the propagation path of interfering signals.

Adaptive noise cancelling is described in a paper "Adaptive Noise Cancelling: Principles and Applications", Bernard Widrow et al., Proceedings of The IEEE, Vol. 63. No. 12, December 1975, pages 1692 to 1716. The paper describes an LMS (least means square) adaptive noise canceller in which a signal $s_k$ is transmitted over a channel and received by a first sensor that also receives a noise $n'_k$ uncorrelated with the signal, where k represents the instant of discrete time. The combined signal and noise $s_k + n'_k$ form the primary input to the canceller. A second sensor receives a noise $n_k$ uncorrelated with the signal but correlated in some unknown way with the noise $n'_k$. This sensor provides the reference input to the canceller. The noise $n_k$ is processed by an adaptive filter to produce an output $\hat{n}_k$ that is a replica of noise $n'_k$. This filter output is subtracted from the primary input $s_k + n'_k$ to produce the system output $d_k = s_k + n'_k - \hat{n}_k$. The system output $d_k$ is scaled by a factor $2\alpha$ by a multiplier, (where $\alpha$ is a constant called 'stepsize'). This adaptive filter has tap weight coefficients $c_0$ through $c_{N-1}$ that are controlled in response to the multiplier output to approximate the impulse response of the transmission channel of noise $n'_k$ to the primary input of the canceller. All tap coefficients of the filter are given in matrix form by the following Equation:

$$c_k = c_{k-1} + 2\alpha \cdot d_k \cdot n_{k-1} \quad (1)$$

where, $c_k$ and $n_k$ are represented by:

$$c_k = [c_0 \cdot c_1 \ldots c_{N-1}]^T \quad (2)$$

$$n_k = [n_0 \cdot n_1 \ldots n_{N-1}]^T \quad (3).$$

The second term of Equation (1) is called the tap-weight trimming value with which the tap weights are updated at periodic intervals.

To achieve tap-weight convergence stability, a paper titled "Learning Identification Method: LIM", IEEE Transactions On Automatic Control, Vol. 12, No. 3, 1967, pages 282-287, describes a method in which the tap weights are controlled according to the following Equation:

$$c_k = c_{k-1} + (2\mu/N\sigma_n^2) \cdot d_k \cdot n_{k-1} \quad (4)$$

where $\mu$ is the stepsize of the LIM algorithm and $\sigma_n^2$ represents an average power of the primary input signal to the adaptive filter.

Another prior art is the adaptive line enhancer (ALE) in which the signal $s_k$ is a wideband signal and the noise $n'_k$ is a periodic signal. These signals are combined to form the primary input to the ALE. The reference input $n_k$ to the ALE is a delayed version of the primary signal. By tap-weight convergence, interference between the wideband and periodic signals is cancelled.

One shortcoming of the prior art techniques is that, during a tap-weight convergence process, signal $s_k$ interferes the residual noise $n'_k - n_k$ which is the only necessary component for tap-weight adaptation. The degree of interference depends on the relationship between the residual noise and signal $s_k$ and on the stepsize value. The tap-weight trimming value varies as a function of the signal-to-noise ratio (SNR) of signal $s_k$, the spectrum of signal $s_k$ and the stepsize. For large values of SNR, a relation $|S_k| > |n'_k - \hat{n}_k|$ holds and the trimming value is severely interfered with signal $s_k$. If signal $s_k$ contains an increasing proportion of high frequency components, the relation $|s_k| > |n'_k - \hat{n}_k|$ holds instantaneously with a higher likelihood of occurrences even if the SNR is of a small value. Therefore, at some peak points, the signal $s_k$ may exceed the residual noise, resulting in a low probability with which valid tap-weight trimming values occur. By taking the amplitude distribution of signal $s_k$ into account, the stepsize must be chosen at a value that is sufficiently small to prevent tap weight divergence. Thus, the tendency is toward choosing the stepsize at an unnecessarily small value with an attendant low convergence speed or at a value which is relatively large but slightly smaller than is required to prevent divergence with an attendant high probability of incorrect tap weight adjustment.

Following the convergence process, the system output $d_k$ is rendered equal to the residual noise $n'_k - \hat{n}_k$ if signal $s_k$ is nonexistent, and hence the tap-weight trimming values are zero. Whereas, if signal $s_k$ is present, the system output $d_k$ is nonzero even if $n'_k - \hat{n}$ and hence the coefficient trimming factor is nonzero. Another shortcoming of the prior art is that, if signal $s_k$ is present, the tap weights are updated with nonzero system output $d_k$, and a residual noise proportional to the stepsize is generated.

SUMMARY OF THE INVENTION

It is therefore an object of the present invention to provide tap-weight adaptation control using a stepsize which is inversely variable with a detected signal power level to provide fast convergence with a large stepsize and high precision approximation with a small stepsize.

According to a first aspect of the present invention, there is provided an interference canceller comprising a first input terminal to which a combined signal and noise is supplied, and a second input terminal to which a reference signal correlated with the noise is supplied. A subtractor has a first input port coupled to the first input terminal and an output port coupled to the output terminal of the canceller. An adaptive filter has an input port connected to the second input terminal and an output port connected to a second input port of the subtractor. A detector is provided for generating an output signal representative of the magnitude of an output signal from the subtractor. A calculation circuit, modifier is coupled to the detector for generating an output signal that is inversely variable as a function of the output signal of the detector. A multiplier scales a stepsize in accordance with the inversely variable signal and multiplies the output signal of the subtractor with the scaled stepsize. The tap-weights of the adaptive filter are controlled according to the multiplied signal.

According to a second aspect of the present invention, there is provided an input terminal to which a wideband signal and a periodic signal are supplied. A subtractor has a first input port coupled to the input terminal and an output port coupled to the first output terminal of the canceller. A delay circuit having a delay time corresponding to the period of the periodic signal is coupled to the input terminal to produce a delayed version of the signals combined at the input terminal. An adaptive filter has an input port connected to the delay circuit and an output port connected to the second input port of the subtractor and to the second output terminal of the canceller. A detector is coupled to the output port of the subtractor for generating a signal representative of the magnitude of an output signal from the subtractor. A modifier circuit coupled to the detector means for generating an output signal that is inversely variable as a function of the output signal of the detector. A multiplier scales a stepsize in accordance with the inversely variable signal and multiplies the output signal of the subtractor with the scaled stepsize, and controls the tap-weights of the adaptive filter according to the multiplied signal.

BRIEF DESCRIPTION OF THE DRAWINGS

The present invention will be described in further detail with reference to the accompanying drawings, in which:

FIG. 1 shows in block form an adaptive noise canceller according to one embodiment of the present invention;

FIG. 2 shows an alternative form of a power detector;

FIG. 3 shows a preferred form of a calculation circuit; and

DETAILED DESCRIPTION

Figure 4:
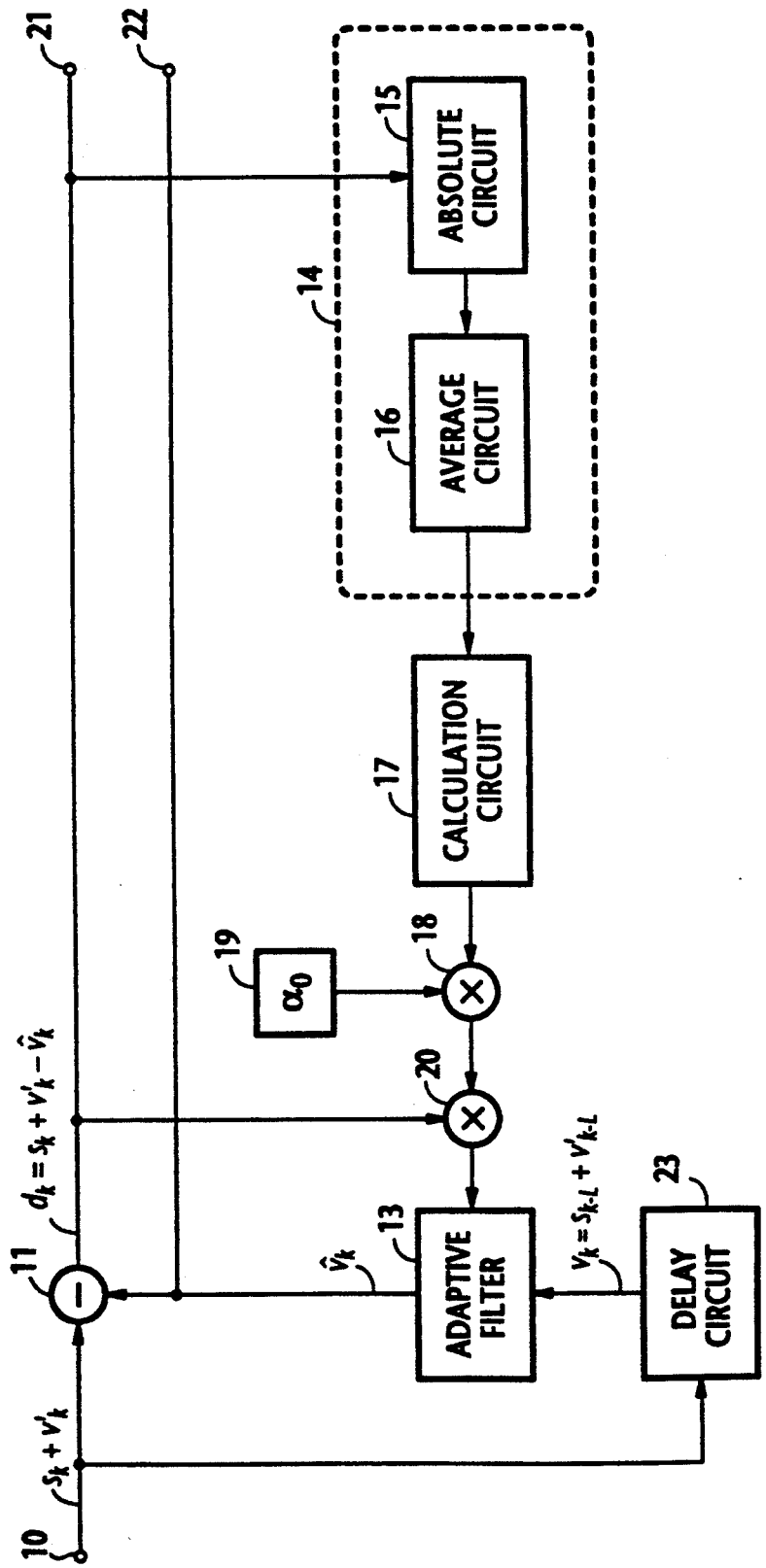
FIG. 4 shows in block form an adaptive line enhancer according to the present invention.

Referring now to FIG. 1, there is shown a noise canceller according to the present invention. The primary signal of the canceller is applied through a primary input terminal 10 to one input of a substractor 11 and the reference input of the canceller is applied through a reference input terminal 12 to a digital adaptive filter 13. A signal $s_k$ and a noise $n'_k$ form the primary input $s_k+n'_k$ to the subtractor 11 and a noise $n_k$ correlated with the noise $n'_k$ forms the reference input to the adaptive filter 13 to produce a noise replica $\hat{n}_k$. The output of adaptive filter 13 is applied to subtractor 11 in which the noise replica is subtracted from the primary input, producing a system output $d_k = s_k + n'_k - \hat{n}_k$.

The system output is applied to a power detector 14 to generate an output representative of the power of signal $s_k$ which interferes with the adaptation control of the canceller. In one embodiment, the power detector 14 comprises an absolute detector 15 and an average circuit 16 connected thereto. Absolute detector 15 produces an output $|d_k| = |s_k+n'_k-\hat{n}_k|$ representative of the absolute value of the system output. After adaptation control proceeds, the following relation holds:

$$|s_k| >> |n_k - \hat{n}_k| \qquad (5)$$

Thus, a relation $s_k + n'_k - \hat{n}_k \approx s_k$ is valid and the system output $d_k$ can be used to approximate signal $s_k$. The time taken to establish such conditions depends on the convergence speed of the adaptive filter 13 and therefore the precision of the approximation increases with time. Average circuit 16, which is implemented with an IIR (infinite impulse response) filter or a first-order integrator, provides smoothing of the input signal with a moving-average time constant that is smaller than the rate of variation of the input signal so that the output of the average circuit varies closely with the varying amplitude of the input signal.

Errors resulting from the approximation are averaged out, improving the precision of the approximation, and the averaged absolute value of the system output $d_k$ is approximately equal to the averaged absolute value of signal $s_k$. Alternatively, power detector 14 is implemented with a squaring circuit 30 instead of absolute circuit 15 as shown in FIG. 2 to produce an average of squared values of the system output $d_k$ to represent the power level of the input signal $s_k$.

The output of average circuit 16 is applied to a calculation circuit 17 having a transfer function $b=f(a)$, where a represents the output of power detector 14 and b represents the output of calculation circuit 17. Specifically, the function $b=f(a)=1/a$. The effect of calculation circuit 17 is to produce an output which is inversely proportional to the power of signal $s_k$ so that when the signal is strong adaptation control is performed with a small stepsize to ensure high precision and when it is weak the control is performed with a large stepsize to ensure high convergence speeds. To this end, calculation circuit 17 is implemented with a reciprocal circuit.

A preferred form of the calculation circuit is shown in FIG. 3. A constant value $\xi$ as determined by constant setting means 31 is summed in an adder 32 with the output of power detector 14 and fed into reciprocal circuit 17 so that the proportion of the signal power is decreased in relation to the constant $\xi$. In this manner, by appropriately determining the constant $\xi$, the influence of the signal power on the stepsize can be appropriately determined.

The output of reciprocal circuit 17 is applied to a multipler 18 to which the stepsize $\alpha_0$ as determined by setting means 19 is applied. Thus, stepsize $\alpha_0$ is scaled inversely in accordance with the average power level of signal $s_k$. The scaled stepsize is applied to a multiplier 20 in which it is further scaled with the system output $d_k$ to produce a tap-weight control signal for coupling to adaptive filter 13. In this way, adaptive filter 13 operates with a stepsize that is variable inversely as a function of the average power of signal $s_k$. The tap-weight adaptation proceeds at a high convergence speed when the stepsize is large and proceeds with precision when the stepsize is small to compensate for varying amplitudes of the input signal.

By providing the tap-weight adaptive control as discussed above, the residual noise $n'_k - \hat{n}_k$ is minimized, producing a noise-free signal $s_k$ from subtractor 11 for coupling to an output terminal 21.

The embodiment shown in FIG. 4 is an adaptive line enhancer which is generally similar in construction to the noise canceller of FIG. 1, the difference being the inclusion of a second output terminal 22 and a delay circuit 23 and the application of signals to the input terminal 10. A wideband interfering signal $s_k$ and a periodic signal $v'_k$ such as the carrier component of a radio signal are combined to form the primary input to the adaptive line enhancer. Delay circuit 23 is coupled to the input terminal 10 to introduce a delay interval L corresponding to the periodic intervals of signal $v'_k$ to the combined signal $s_k + v'_k$ to produce an output $v_k = s_{k-L} + v'_{k-L}$. The output of delay circuit 23 is applied to adaptive filter 13 to produce an output $v_k$ which is an estimate of the periodic signal $v'_k$. The estimated output $v_k$ is subtracted from the combined input $s_k + v'_k$ to generate a first system output $d_k = s_k + v'_k - v_k$. The tap weights of adaptive filter 13 are controlled in response to the variable stepsize in the same manner as described above, so that the wideband signal $s_k$ having no periodic component $v'_k$ appears at the output terminal 21 and the periodic signal $v'_k$ containing no wideband component $s_k$ appears at the output terminal 22.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. An interference canceller comprising:
    a first input terminal to which a combined signal and noise is supplied, and a second input terminal to which a reference signal correlated with said noise is supplied;
    a subtractor having a first input port coupled to said first input terminal, a second input port, and an output port;
    an adaptive filter having controllable tap weights, the filter having an input port connected to said second input terminal and an output port connected to the second input port of the subtractor;
    detector means coupled to the output port of said subtractor for generating an output signal representative of the magnitude of an output signal from said subtractor;
    modifier means coupled to said detector means for generating an output signal inversely variable as a function of the output signal of the detector means;
    multiplier means for scaling a stepsize in accordance with said inversely variable signal and multiplying the output signal of said subtractor with the scaled stepsize, and controlling the tap-weights of said adaptive filter according to said multiplied signal; and
    an output terminal coupled to the output port of said subtractor.

2. An interference canceller as claimed in claim 1, wherein said detector means comprises an absolute circuit coupled to the output port of said subtractor to produce an output signal representative of the absolute value of the subtractor output signal, and an average circuit for averaging the output signal of said absolute circuit.

3. An interference canceller as claimed in claim 1, wherein said detector means comprises a squaring circuit coupled to the output port of said subtractor to produce an output signal representative of the squared value of the subtractor output signal, and an average circuit for averaging the output signal of said squaring circuit.

4. An interference canceller as claimed in claim 1, further comprising an adder for summing the output signal of said detector means with a constant value to produce a summed output signal, and supplying the summed output signal to said modifier means.

5. An interference canceller comprising:
    an input input terminal to which a wideband signal and a periodic signal are supplied;
    a subtractor having a first input port coupled to said input terminal, a second input port, and an output port;
    delay means coupled to said input terminal, said delay means introducing a delay interval corresponding to the period of said periodic signal;
    an adaptive filter having controllable tap weights, the filter having an input port connected to said delay means and an output port connected to the second input port of the subtractor;
    detector means coupled to the output port of said subtractor for generating a signal representative of the magnitude of an output signal from said subtractor;
    modifier means coupled to said detector means for generating an output signal inversely variable as a functior of the output signal of the detector means;
    multiplier means for scaling a stepsize in accordance with said inversely variable signal and multiplying the output signal of said subtractor with the scaled stepsize, and controlling the tap-weights of said adaptive filter according to said multiplied signal;
    a first output terminal coupled to the output port of said subtractor; and
    a second output terminal coupled to the output port of said adaptive filter.

6. An interference canceller as claimed in claim 5, wherein said detector means comprises an absolute circuit coupled to the output port of said subtractor to produce an output signal representative of the absolute value of the subtractor output signal, and an average circuit for averaging the output signal of said absolute circuit.

7. An interference canceller as claimed in claim 5, wherein said detector means comprises a squaring circuit coupled to the output port of said subtractor to produce an output signal representative of the squared value of the subtractor output signal, and an average circuit for averaging the output signal of said squaring circuit.

8. An interference canceller as claimed in claim 5, further comprising an adder for summing the output signal of said detector means with a constant value to produce a summed output signal, and supply the summed output signal to said modifier means.

* * * * *

UNITED STATES PATENT AND TRADEMARK OFFICE
CERTIFICATE OF CORRECTION

PATENT NO. : 5,192,918
DATED : March 9, 1993
INVENTOR(S) : Akihiko SUGIYAMA

It is certified that error appears in the above-identified patent and that said Letters Patent is hereby corrected as shown below:

Col. 1, line 68, delete "$n_k$" and insert --$\hat{n}_k$--

Col. 2, line 28, delete "$\hat{n}$" and insert --$\hat{n}_k$--

Col. 4, line 64, delete "$v_k$" and insert --$\hat{v}_k$--

Col. 4, line 66, delete "$v_k$" and insert --$\hat{v}_k$--

Col. 4, line 68, delete "$v_k$" and insert --$\hat{v}_k$--

Signed and Sealed this

Fourteenth Day of December, 1993

Attest:

BRUCE LEHMAN

*Attesting Officer*   *Commissioner of Patents and Trademarks*